UNITED STATES PATENT OFFICE.

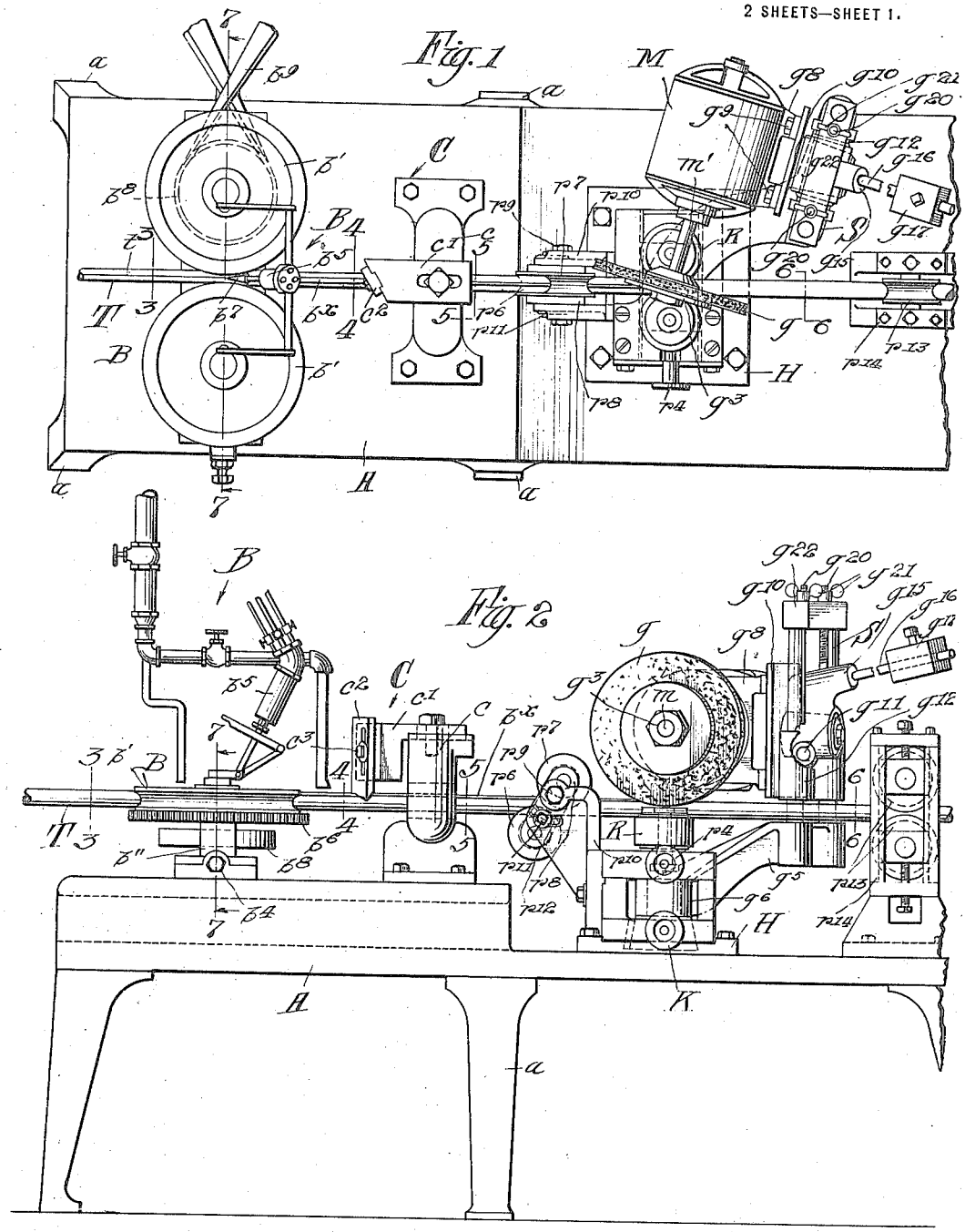

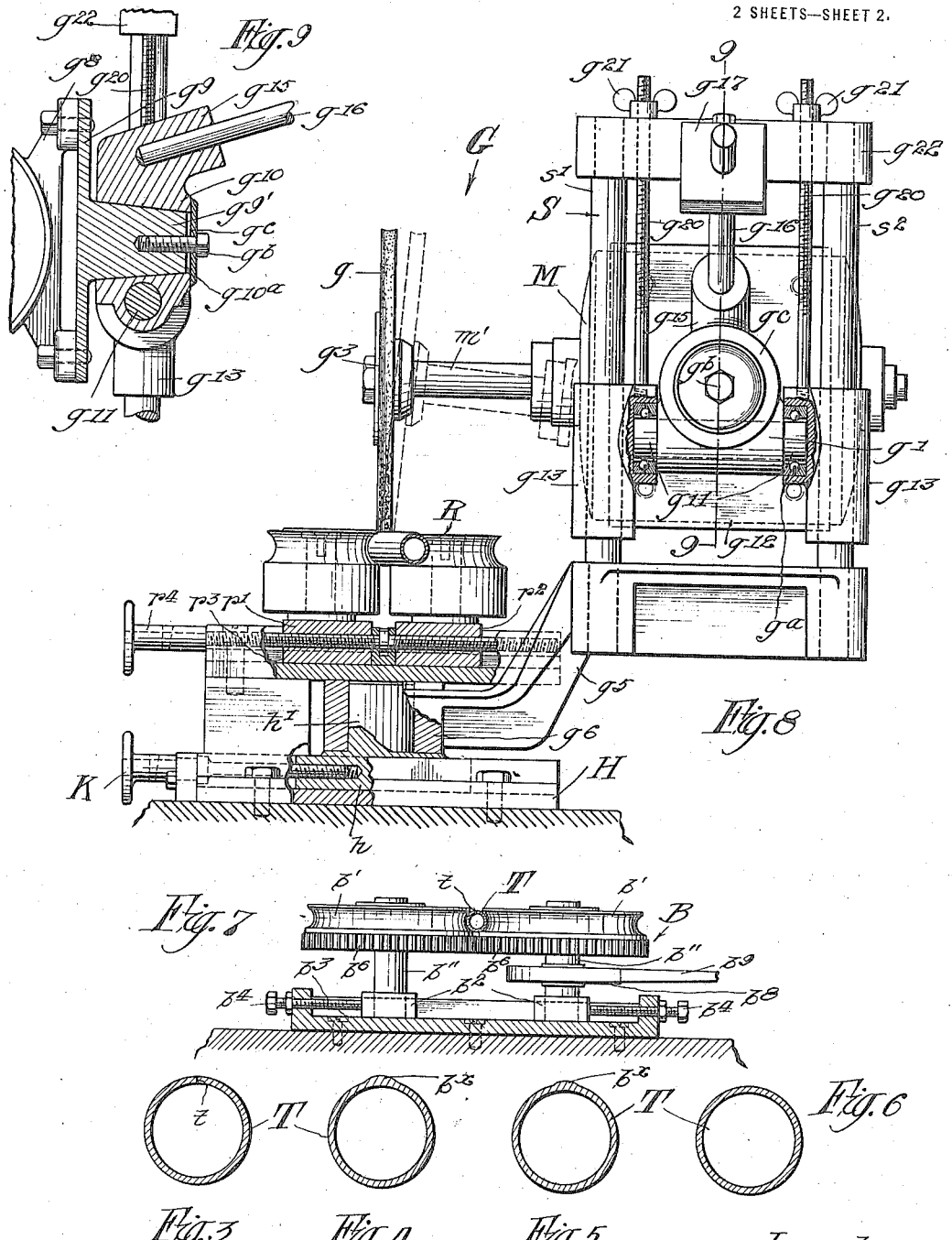

MARSHALL BURNS LLOYD, OF MENOMINEE, MICHIGAN, ASSIGNOR, BY MESNE ASSIGN-
MENTS, TO THE ELYRIA IRON & STEEL COMPANY, OF ELYRIA, OHIO, A CORPORA-
TION OF OHIO.

DEBURRING MECHANISM FOR WELDED TUBING AND THE LIKE.

1,184,973.      Specification of Letters Patent.      Patented May 30, 1916.

Application filed February 5, 1914. Serial No. 816,827.

*To all whom it may concern:*

Be it known that I, MARSHALL BURNS LLOYD, a citizen of the United States, and a resident of Menominee, county of Menominee, and State of Michigan, have invented a certain new, useful, and Improved Deburring Mechanism for Welded Tubing and the like, of which the following is a specification.

My invention relates generally to improvements in mechanism for finishing tubing and relates more particularly to mechanism for removing the roughened portion of tubing caused by welding or otherwise forming tubing from strip metal.

The general object of my invention is to provide simple, efficient and durable mechanism wherewith the raised seam or bur caused in the process of welding or similarly forming metal tubing from strip metal may be removed.

A further object of my invention is to provide simple mechanism which is capable of co-acting with continuously acting welding mechanism to remove the bur occasioned by the welding operation, and which shall be capable of considerable adjustment, as may be necessary to finish tubes of different textures, sizes, and to finish tubing at various speeds. And still another object of my invention is to provide tube finishing means of the character described which may be quickly and easily adjusted to act properly under varying conditions, and which when once properly adjusted for finishing a given type of tube will act to finish a great quantity of welded tubing of this type without further attention, to the end that welded tubing may be continuously formed.

My invention consists generally in means for forwarding a welded tube and a grinding element arranged in the path of the tube and formed and adapted to exert the desired rotary pressure upon the welding bur.

My invention consists also in means for forwarding a welded tube, a bur reducing tool and a grinding element arranged in the path of the tube and formed and adapted to exert the desired rotary pressure upon the remaining welding bur.

My invention consists further in deburring mechanism for welding tubing and the like, comprising welded tube forwarding mechanism, a rotary grinder arranged in the path of the tube, means for rotating the grinder at high speed, easily adjustable means for securing the proper pressure of the grinder against the welding bur, and means for varying the angular position of the grinder relative to the longitudinal axis of the tube.

My invention also consists in the novel construction, arrangement and coöperation of parts wherewith it is possible to attain the objects outlined above, as well as others which will appear more fully hereinafter.

My invention will be more readily understood by reference to the accompanying drawings, which illustrate one form of mechanism embodying my invention and in which—

Figure 1 is a plan view of mechanism embodying my invention shown, for the purpose of illustration, in conjunction with tube welding mechanism; Fig. 2 is a side elevation thereof; Figs. 3, 4, 5, and 6 are respectively enlarged and somewhat exaggerated cross-sectional views on the lines 3—3, 4—4, 5—5, and 6—6 of Figs. 1 and 2, showing the evolution of the tube from its unwelded form to the welded and finished form. Fig. 7 is a detail view substantially on the line 7—7 of Figs. 1 and 2 showing the means of driving the welding rolls to forward the tube; Fig. 8 is an enlarged end view showing the means of mounting the grinding element and motor in the standard; the means of mounting the standard; and the contiguous parts, certain of the parts being broken away better to disclose their construction; and Fig. 9 is a detail view on the line 9—9 of Fig. 8 showing the means of holding the motor.

In the formation of tubing from strip metal stock, either by subjecting it to the action of welding or brazing mechanism or other similar mechanism for closing the tube, the tube is roughened on the line of juncture. This varies under different conditions, in some instances a bur of considerable size being formed. The size of the bur is determined largely by the texture of the metal being joined; the speed at which it is passed through the welding operation; the heat of the flame; the pressure applied to the tube contiguous the flame; and other similar factors. The economical processes of producing tubing from strip metal consist generally in continuously forming strip metal into tube form having a longitudinal seam, passing the tube under a welding flame, applying more or less pressure to close the seam, or join the tub ends cross-sectionally considered. For most commerci l purposes the tube is not fit for use until the welding bur has been removed. Because of the facts stated it has been difficult to provide suitable means which will act properly to reduce the bur caused by the welding operation without interrupting the movement of the tube and at the same time provide a finished tube of substantially uniformly smooth exterior and of the intended cross-section. After considerable experimentation, I have produced mechanism which is admirably adapted for this purpose and I will now describe it in detail.

Referring to the drawings A represents a strong bench or table which is supported at a convenient height by legs $a$. This bench is adapted to support so many of the forming, welding, finishing, and other mechanisms as may be desired, and I wish to be understood that I am not limited to the use of any particular number or form of the tube shaping and welding mechanisms nor to the particular construction and arrangement shown. I have chosen to illustrate mechanism for welding tubing which may be either continuously formed or formed into lengths of predetermined sizes. The essential features of such mechanism, so far as I am concerned, reside largely in mechanism for forwarding the welded tube under and in my novel deburring mechanism.

T represents the tube which has been formed from a strip metal by suitable mechanism and presents a longitudinal seam $t$.

B represents the welding mechanism and as here shown comprises a pair of horizontally disposed co-acting rolls $b'$ $b'$.

As is best shown in the detail view Fig. 7, the rolls $b'$ $b'$ are mounted in standards $b''$, which in turn are supported in bearing boxes $b^2$. The bearing boxes are adjustable in a guide-way $b^3$ by means of adjusting screws $b^4$ and thereby the proper pressure can be put upon the tube to close the seam $t$. The rolls $b'$ $b'$ besides serving to apply pressure to the tube to close the seam also serve to forward or advance the tube. The rolls carry intermeshing gears $b^6$ and one of the standards $b''$ is provided with a pulley $b^8$ whereby motion may be imparted to the rolls through the medium of a belt $b^9$ which is connected to a suitable source of power (not indicated). When tubing of heavy form is being welded or when the tubing is also being drawn through forming mechanism, it is customary to provide means forward of the welding and finishing mechanism for pulling or assisting the tubing through the different mechanisms, but I do not deem it necessary to show or describe same here, since the rolls $b'$ $b'$ under some circumstances are sufficient to forward the tube under the bur removing mechanism, and at any rate indicate one means of advancing or propelling a welded tube. Arranged over the rolls $b'$ $b'$ is a torch $b^5$ having a nozzle $b^7$ which serves to project a welding flame upon the seam $t$ of the tube as it passes between the large rolls $b'$ $b'$ and with the pressure of the rolls the ends of the tube contiguous to the seam are permanently united. As previously stated, in this operation a bur of greater or lesser size is raised upon the tube. This bur is indicated and somewhat exaggerated in Fig. 4 of the drawing, and it is the purpose of my invention to provide mechanism for removing this bur, without in any way interfering with the forward movement of the tube, or the welding operation.

As before stated, in some instances a bur of considerable size is raised by the welding operation. I have indicated such a bur in Fig. 4 of the drawings. In such instances I prefer to rough off a portion of the bur before permitting it to reach the grinding mechanism, and for this purpose I provide a cutting mechanism C. This mechanism comprises a standard $c$, a block $c^1$, and a vertically disposed cutting tool $c^2$. This tool, as is best shown in Fig. 1, is preferably placed at an angle to the longitudinal axis of the tube and the lower portion of the tool is preferably curved to follow generally the curvature of the tube. As the tube is forwarded thereunder, the tool acts to scrape off or remove a portion of the bur leaving it substantially finished, as indicated in Fig. 5. The tool is vertically adjustable by means of a slot and pin connection $c^3$. Hence, as the tube leaves the cutting mechanism C, the greater part of the bur has been removed but there still remains a raised bur longitudinally disposed on the tube.

The bur is not a single line which could be removed by a single line of single point contact tool to produce a finished tube. Instead the bur is of considerable width. It is all to be removed and the tubing is to be left in its intended form. Therefore, the grinding tool must be of a kind actually to form a portion of the cylindrical surface of the tube. This can not be accomplished by a grinding wheel which operates at right angles to the axis of the tube, for such a wheel if operating upon more than a single line would form a trough or concavity in the tube. Again it can not be done successfully by a grinding wheel which rotates in the plane of the axis of the tube, for the reason that though such a wheel were concaved, it would operate on only a single curved line lying in a plane at right angles to the axis and it would be forced to reduce the whole cross section of the bur at every instant of operation. This would be impracticable by reason of the irregularity of the bur and the consequent varying wear upon the grinding wheel which would cause a distortion of the curve to be imparted to the cylindrical face of the tubing.

Further a wheel so disposed would throw the debris upon the top of the tube and into the mechanism forward of it. To avoid these difficulties I employ a wheel having a concave face of a shape to form a portion of the tube and so disposed as to operate upon a considerable longitudinal portion of the bur and at the same time throw the debris away from the tubing and other mechanism operating thereon. As depicted in the drawings my grinding wheel $g$ is positioned in a plane which intersects the tubing at an acute angle whereby a thin grinding wheel is caused to operate upon a length of tubing considerably exceeding the thickness of the wheel. By placing it in this manner it also continuously trims itself and prevents excessive wear at any one place. The face of the wheel thus disposed is concaved or curved accurately to conform to the intended cross section of the tubing. It will be observed that whether the tubing and the grinding wheel move in the same general direction or in contrary directions, the debris is thrown clear of the tubing as effectively as would be the case with a grinding wheel disposed at right angles to the tubing.

Under certain conditions the tube may be forwarded more rapidly than others. For instance, in the tube forming mechanism where the tube is welded by passing it under a welding flame, the speed of the tube is usually determined by the size and character of the welding flame and the thickness of the metal. Hence, when tubes of different sizes or thickness, or tubes in which the texture and character of the metal varies, the tube travel will vary, and as stated, these different factors will also raise burs of different sizes upon the tube. The result of this is that considerable latitude of adjustment must be provided in the surface finishing mechanism, for it is obvious that if a tube with a given bur traveled at one speed under a member rotating at a fixed speed, and the same tube with a similar bur traveling at a different rate of speed were passed under the same rotating member that it would not act properly under both conditions to finish the tube. It is impracticable to vary the speed of a grinder to adjust it for the proper grinding effect. I have, therefore, provided a unique method, whereby great latitude and accuracy in adjustment may be obtained.

M represents a motor, the armature shaft $m'$ of which is suitably extended to accommodate the grinding wheel $g$. The wheel $g$ may be suitably secured thereto by means of a plate and nut $g^3$. The motor M is provided with a cast base $g^8$ which is bolted to a member $g^9$ having a projecting conical stud $g^{9'}$. The sliding blocks $g^{13}$ carry a member $g^{10}$ which is pivotally mounted therein by a shaft $g^{11}$ held in ball bearings $g^a$. The member $g^{10}$ is provided with a tapered socket $g^{10a}$ to receive the stud $g^{9'}$ and thus by means of a single bolt $g^b$ and the plate $g^c$ the motor and grinding wheel are mounted rigidly in the rock member $g^{10}$.

The parts $g^{13}$—$g^{13}$ connected by a shaft $g^{11}$ may thus be said to constitute a cross head $g^{12}$ which is vertically slidable in a standard S, the risers $s^1$ and $s^2$ extending through holes formed in the side portions $g^{13}$. To support the cross head, motor and grinding wheel in proper position and to secure the proper pressure of the grinding wheel against the tube, I provide a lever carrying an adjustable weight which is so connected to the motor as to control the grinding pressure of the emery wheel against the tube. In this instance I provide the pivoted member $g^{14}$ with a large boss $g^{15}$ and therein I secure a long arm or rod $g^{16}$ upon which I adjustably secure a heavy weight $g^{17}$. Since the member $g^{10}$ is pivotally mounted in the cross head $g^7$ the weight $g^{17}$ acts to counterbalance the weight of the motor and grinding wheel and hence, by this means, I am able accurately to balance the motor and grinding wheel. The weight $g^{17}$ is positioned so that the weight of the grinding wheel and motor will slightly overbalance that of the counterweight and hence exert a pressure against the tube. The cross head $g^7$ can be vertically moved by means of the upstanding threaded rods $g^{20}$, and the thumb screws $g^{21}$ operating against the tie bar $g^{22}$.

I also find that for tubes of different sizes and when grinding tubes varying in texture and thickness that the best grinding effect can be obtained by a definite angular position of the grinding wheel, and for this reason I prefer to mount the standard S so that it may be quickly and easily swung to the desired angular position relative to the longitudinal axis of the tube. In order that the grinding mechanism may also be properly alined with the other mechanisms, I prefer also to provide for the shifting of the grinding mechanism as a whole. For these purposes I bolt a casting H to the bed of the machine and in this casting I mount a slidable block $h$ having a central upstanding stud $h^1$. The lower ends of the standards S are contained in an arm member $g^5$ which extends therefrom and carries at the opposite end a bearing $g^6$ formed to fit over the stud $h^1$, as clearly shown in Fig. 8. The whole grinding mechanism G can thereby be readily swung to any desired angular position, and when so swung the weight of the motor grinding wheel and other parts at the outer end of the arm is sufficient to hold it in such position. So also the grinding mechanism may be moved back and forth by means of the adjusting screw K which is threaded into the base $h$.

Because of the rapidly rotating grinder operating against the tube it is preferable, though not necessary, to hold the tube positively against movement adjacent the grinding wheel. For this purpose I provide a pair of horizontally disposed co-acting rolls R. These rolls are formed to grasp the tube and hold it against movement and at the same time expose the upper portion thereof to the action of the grinding wheel. The rolls are mounted in blocks $r^1$, $r^2$, which are slidable in a way $r^3$, secured to the top of the casting H. In order that the rolls may be regulated to grasp different sized tubes, I provide a right and left hand adjusting screw $r^4$ which is threaded through the blocks $r^1$ and $r^2$. It will be seen therefore that by the mechanisms described, great latitude of adjustment is provided so that the parts may be positioned in the position best adapted to the particular article being finished. I also prefer, in some instances, further to guide and steady the tube adjacent the grinding wheel. The rolls $r^6$ and $r^7$ serve this purpose at one side of the grinding wheel. These rolls are carried in a frame $r^8$ which is pivotally attached at $r^9$ to a bracket $r^{10}$. The frame $r^8$ of the rolls may be swung to different angular positions, thereby obviously changing their effective gripping relation in order to accommodate different sized tubes or articles. The frame $r^8$ is fixed in any desired angular position by means of the stud screw $r^{11}$ operating in the curved slot $r^{12}$ of the bracket. As the tube emerges from the grinding operation it is further constrained by a pair of rolls $r^{13}$ mounted in a suitable standard $r^{14}$. It will be understood that in many instances it is not necessary to provide so many pairs of guide rolls, but I find that the tube can be more accurately finished when it is firmly held against vibration.

In some instances the tube is likely to twist slightly and thereby present the bur a little to one side or the other of the vertical. Hence in order that I may present the grinding wheel in proper position to act upon the bur under all circumstances, I simply loosen the bolt $g^b$ and swing the motor, thereby swinging the attached grinding wheel at an angle to the vertical. One such position of the grinding wheel is indicated by dotted lines in Fig. 8. The factors causing this shifting of the bur position are present during the making of all similar sized tubes of the same metal so that frequent adjustment of the grinding wheel is not necessary. Hence with this and the other means of adjustment the grinding wheel can be positioned to act to the best advantage under all circumstances since it can be moved at an angle to the longitudinal axis of the tube; to both sides thereof; circumferentially of the tube; and raised and lowered with respect to the tube.

With the mechanism shown and described, it is possible continuously to remove the seam bur from the tube without in any wise hindering or deterring the action of the welding mechanism, and also quickly and easily to adjust the grinding wheel to the proper working pressure under varying conditions. Because of the nicely balanced mounting of the emery wheel it will follow the unevenness of the tube rather than grind off so much as to spoil the tube.

It is thought that from the detailed description given the advantages will be apparent to those skilled in the art to which this appertains. Various modified structures embodying my invention will at once present themselves to those skilled in the art to which this appertains and I do not wish to limit myself to the precise construction herein shown and described, except as may be necessary by express limitations shown in the claims hereunto appended.

I claim:

1. In mechanism of the class described, means for feeding tubing and holding the same against rotation, in combination with bur-reducing mechanism comprising a rotary grinding element positioned to act upon the bur of the tube at an acute angle thereto and having its periphery concaved to reduce the welded portion of the tube to intended form.

2. In mechanism of the class described welded tube forwarding mechanism in combination with surface finish mechanism arranged in the path of the tube and positioned to act upon the welded portion thereof, said surface finish mechanism comprising a grinding wheel formed with a concave grinding surface and positioned to act upon the tube at an angle to its weld bur as and for the purpose specified.

3. In mechanism of the class described the combination of means for moving a tube forward, a rotary grinder arranged in the path of the tube, means for rotating the grinder at high speed, and self adjustable means permitting vertical movement of the grinder and maintaining substantially uniform pressure of the grinder upon the tube.

4. A deburring mechanism comprising in combination tube forwarding means and a rotary grinder arranged to act upon the tube, means for rotating the grinder at high speed and means for varying the angular position of the grinder relative to the tube.

5. In mechanism of the class described means for imparting longitudinal movement to welded tubing and the like in combination with grinding mechanism arranged in the path of the tube and positioned to act upon the welded portion thereof, said grinding mechanism comprising a grinding wheel, a motor for imparting motion thereto, and means for varying the rotary pressure of the grinder upon the tube.

6. In mechanism of the class described, means for imparting longitudinal movement to welded tubing and the like, in combination with grinding mechanism arranged in the path of the tubing and positioned to act upon the welded portion thereof, said grinding mechanism comprising a grinding wheel, a motor for imparting motion thereto, means for varying the rotary pressure of the grinder upon the tube, and means for varying the relative angular positions of the grinder and tube.

7. In mechanism of the class described means for forwarding tubing in combination with surface finishing mechanism arranged in the path of the tube and positioned to act upon the seam bur thereof, said mechanism comprising a power driven grinding wheel, a standard formed and adapted for movement into various angular positions, for supporting the grinding wheel and means for adjustably securing the grinding wheel to the standard.

8. In mechanism of the class described, tube forwarding mechanism in combination with surface finishing mechanism arranged in the path of the tube and positioned to act upon the seam portion thereof, said surface finishing mechanism comprising a power driven grinding wheel, a lever carrying the same, a standard whereon the lever is adjustably pivoted and means upon said lever partially balancing the grinding wheel and its driving mechanism.

9. In mechanism of the class described tube forwarding mechanism in combination with surface finishing mechanism arranged in the path of the tube and positioned to act upon the welded portion thereof, said surface finishing mechanism comprising a power driven grinding wheel, a standard for supporting same, and means carried by the standard for balancing or partially balancing the grinding wheel, said standard being formed and adapted for movement into various angular positions, as and for the purpose specified.

10. In a deburring mechanism for tubing and the like, the combination of tube forwarding mechanism with surface grinding mechanism arranged in the path thereof, and positioned to act upon the seam bur of the tube, said grinding mechanism comprising a motor and grinding wheel attached thereto, a standard, a sliding block arranged in said standard, and carrying said motor, and a weighted lever connected to the sliding block, as and for the purpose specified.

11. In a deburring mechanism for tubing and the like, a grinding mechanism comprising in combination a standard, means for swingably supporting the standard, a slidable block arranged in the standard, a motor affixed thereto, a grinding wheel carried by the motor, and an adjustably weighted lever pivoted to the standard and connected to the adjustable block for regulating the position thereof.

12. In mechanism of the class described, tube forwarding means in combination with a partially balanced rotary grinding element positioned to act upon the welded portion of the tube, means for swinging the grinding element to various angular positions, and means for adjusting the grinding element transversely of the tube.

13. In mechanism of the class described, tube positioning means, grinding wheel supporting means, and a grinding wheel held thereon and positioned to act upon the seam portion of the tube and formed to permit swinging movement of the grinding wheel circumferentially of the tube.

14. In mechanism of the class described, tube positioning means, a standard adapted to swing in a horizontal plane, a power driven grinding wheel mounted for vertical and rotary movement with respect to the standard and positioned to act upon the welded portion of the tube.

15. A deburring mechanism for welded tubing and the like, comprising in combination tube positioning mechanism, a power driven grinding wheel, means for supporting same and adapted to secure adjustment of the grinding wheel to and from the tube, transversely thereof, angular with respect to the longitudinal axis of the tube and radially of the tube, as and for the purpose specified.

16. The improvements herein described, comprising means for feeding tubing forward while holding it against rotation in combination with a suitably driven grinding wheel positioned above the tubing to act upon the seam bur thereof at an acute angle thereto, and means partially balancing and yieldingly supporting said wheel in such manner that it works against the tubing by gravity.

In testimony whereof, I have hereunto set my hand, this 20th day of January, 1914, in the presence of two subscribing witnesses.

MARSHALL BURNS LLOYD.

Witnesses:
ARTHUR W. NELSON,
JOHN R. LEFEVRE.